United States Patent
Ianni et al.

(10) Patent No.: US 7,983,115 B2
(45) Date of Patent: Jul. 19, 2011

(54) SYSTEM AND METHOD FOR MANAGING TIME IN AUTOMATIC CONTROL EQUIPMENT

(75) Inventors: Giovanni Ianni, Pegomas (FR); Jacques Piacibello, Antibes (FR)

(73) Assignee: Schneider Electric Industries SAS, Rueil-Malmaison (FR)

( * ) Notice: Subject to any disclaimer, the term of this patent is extended or adjusted under 35 U.S.C. 154(b) by 309 days.

(21) Appl. No.: 12/102,267

(22) Filed: Apr. 14, 2008

(65) Prior Publication Data

US 2008/0267328 A1    Oct. 30, 2008

(30) Foreign Application Priority Data

Apr. 24, 2007   (FR) ...................... 07 54652

(51) Int. Cl.
*G04C 11/00*    (2006.01)

(52) U.S. Cl. .......................................... 368/46; 713/400

(58) Field of Classification Search .................. 368/46, 368/48
See application file for complete search history.

(56) References Cited

U.S. PATENT DOCUMENTS

| | | | | |
|---|---|---|---|---|
| 4,419,629 | A * | 12/1983 | O'Brien | 327/99 |
| 5,661,700 | A * | 8/1997 | Weppler | 368/46 |
| 6,603,365 | B1 | 8/2003 | Dotzler et al. | |
| 6,958,953 | B2 * | 10/2005 | Retter et al. | 368/47 |
| 7,017,066 | B2 * | 3/2006 | Retter et al. | 713/400 |
| 7,394,726 | B2 * | 7/2008 | O'Neill et al. | 368/21 |
| 7,474,651 | B2 * | 1/2009 | Ozawa | 370/350 |
| 7,500,130 | B2 * | 3/2009 | Brokish | 713/502 |
| 7,661,008 | B2 * | 2/2010 | Retter et al. | 713/500 |
| 2004/0205368 | A1 | 10/2004 | Lange-Pearson et al. | |
| 2008/0104434 | A1 * | 5/2008 | May | 713/322 |

FOREIGN PATENT DOCUMENTS

| | | |
|---|---|---|
| FR | 2 767 935 | 3/1999 |
| JP | 55-115120 | 9/1980 |
| WO | WO 01/90865 A1 | 11/2001 |

* cited by examiner

*Primary Examiner* — Sean Kayes
(74) *Attorney, Agent, or Firm* — Oblon, Spivak, McClelland, Maier & Neustadt, L.L.P.

(57) ABSTRACT

A time management system that includes a first clock having a first counter operating on a first timebase, a second clock having a second counter operating on a second timebase identical to the first timebase and a third counter operating on a third timebase less than the second timebase. The time management system performs a resynchronization of the second clock after the main electrical power supply has been restored, this resynchronization including, on a modification of the first counter, loading the first counter into the second counter and in zeroing the third counter.

15 Claims, 1 Drawing Sheet

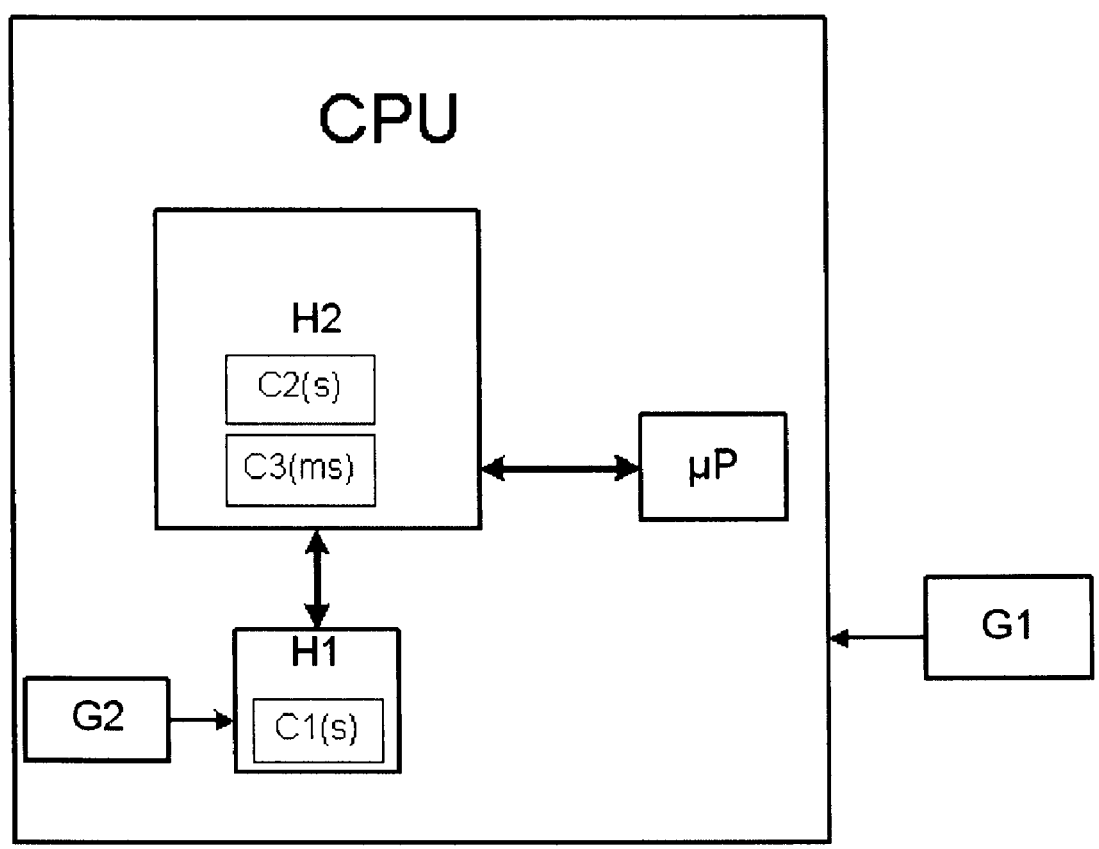

SYSTEM AND METHOD FOR MANAGING TIME IN AUTOMATIC CONTROL EQUIPMENT

FIELD OF THE INVENTION

The present invention relates to a method and a system for managing time in automatic control equipment.

BACKGROUND OF THE INTENTION

The term "automatic control equipment" is used hereinafter to denote a programmable logic controller, a monitoring/control station, a digital control, or any automatic control module that can contain and run an application program making it possible to monitor/control to an automatic control application, notably like a variable speed drive or a logic module.

Automatic control equipment comprises a central processing unit (CPU) and at least one input/output module providing the link between the central processing unit and sensors and preactuators of the automatic control application to be controlled.

Normally, automatic control equipment such as a programmable logic controller is modular in construction, that is, it consists of several modules that intercommunicate via a backplane bus. A programmable logic controller typically includes a power supply module for supplying the other modules with the various voltages via the backplane bus, a rack for mechanically fixing the modules and supporting the backplane bus to which the modules are electrically connected, and a central processing unit module. The central processing unit module includes a microprocessor and storage means storing a manufacturer program ("firmware") expressed in a language specific to the manufacturer of the automatic control equipment, an application program (also called user program) for handling the monitoring and/or control of an automatic control application or of a part of an automatic control application by means of inputs/outputs driven by the application program, and data, in particular images of the states of the input/output modules. The programmable logical controller also includes several input/output modules of various types according to the process to be controlled and one or more modules for communicating with communication networks (Ethernet, etc) or control interfaces such as screen, keyboard, etc.

In order to manage and synchronize the various automatic control tasks, the central processing unit of the automatic control equipment comprises a clock. In the prior art, this clock is a conventional RTC ("Real Time Clock") hardware component which the microprocessor accesses to manage the time in the automatic control equipment. When current is interrupted, a battery is used to maintain time management for the duration of the interruption. However, this type of time management presents certain drawbacks listed below:

- since the RTC hardware component is external, access to it is particularly slow,
- The standard RTC components are limited to one second of resolution. The use of an RTC component having a resolution less than a second would lead to higher consumption and generate higher cost.
- The time-related objects managed by the manufacturer program (for example, a timer) are not synchronized with the RTC hardware component.

The U.S. Pat. No. 6,603,365 notably proposes replacing the battery with a capacitor. However, the drawback associated with the slowness of access is unresolved.

The aim of the invention is to propose a method and a system for managing time in automatic control equipment in which the current interruptions are controlled with no damage and in which the time information is consistent, presents sufficient resolution and can be quickly recovered.

SUMMARY OF THE INVENTION

This aim is achieved by a time management method implemented in automatic control equipment, based on a system that includes a first clock having a first counter operating on a first timebase, a second clock having a second counter operating on a second timebase identical to the first timebase, a third counter operating on a third timebase less than the second timebase, a main electrical power supply for powering the first and second clocks, and an auxiliary electrical power supply for powering the first clock (H1) in the event of a main electrical power supply outage. The time management method performs a periodic synchronization between the first counter and the second counter, and a resynchronization of the second clock when the main electrical power supply is restored, this resynchronization including, on a modification of the first counter, loading the first counter into the second counter and in zeroing the third counter.

According to a particular feature, the first clock is a hardware component of RTC type.

According to another particular feature, the first timebase is the second.

According to another particular feature, the second clock is incremented by software.

According to another particular feature, the third timebase is the millisecond.

According to another particular feature, the auxiliary electrical power supply is a capacitor.

According to another particular feature, the periodic synchronization is performed on the basis of the second counter of the second clock.

The invention also relates to a time management system in automatic control equipment, this system being characterized in that it includes a first clock having a first counter operating on a first timebase, a second clock having a second counter operating on a second timebase identical to the first timebase and a third counter operating on a third timebase less than the second timebase. Means for periodically synchronizing the second counter and the first counter, a main electrical power supply for powering the first and second clocks, an auxiliary electrical power supply for powering the first clock in the event of an outage of the main electrical power supply and means for performing a resynchronization of the second clock after the end of a main electrical power supply outage are also provided in the time management system. The resynchronization including, on a modification of first counter, loading the first counter into the second counter and in zeroing the third counter.

According to the invention, the first clock is, for example, a low cost RTC hardware component having a low-accuracy timebase. The timebase of the RTC hardware component employed in the invention is, for example, the second whereas the timebase of the second clock is lower and is, for example, the millisecond. According to the invention, on a restart after a main electrical power supply outage, the data of the first clock is not sufficient to perfectly resynchronize the second clock. It is therefore necessary to detect the modification of the first counter of the first clock to write the counters of the first clock into the second clock and to zero all the counters of the second clock which have a lower timebase not managed by the first clock.

According to the invention, the periodic synchronization of the two clocks is performed in normal operation to avoid too great a drift of one of the clocks relative to the other. In practice, after a main power supply outage and the resynchronization of the second clock using the first clock, the counters of the second clock must be prevented from being able to take values less than those that they had before the outage and so generate an inconsistency in the time management.

Other characteristics and advantages will emerge from the detailed description which follows with reference to an embodiment given by way of example and represented by the appended drawings in which:

BRIEF DESCRIPTION OF THE DRAWINGS

FIG. 1 represents the time management system implemented in automatic control equipment.

DETAILED DESCRIPTION

Automatic control equipment is well known from the prior art and its operation will not be detailed in the present application.

Automatic control equipment such as a programmable logic controller has in its central processing unit CPU a time management system enabling it, using notably its microprocessor µP, to synchronize its tasks and manage the power supply outages without damage and without affecting the operation of the equipment when it is restarted after the outage.

The system comprises a main electrical power supply G1 and an auxiliary electrical power supply G2, consisting, for example, of a capacitor, designed to maintain time management in the automatic control equipment when the main electrical power supply G1 is interrupted. The main electrical power supply G1 is, for example, that of the programmable logic controller powering the modules of the logic controller via the backplane bus.

According to the invention, the time management system therefore comprises a first clock H1 consisting of a hardware component of RTC ("Real Time Clock") type. This first clock H1 is managed using a quartz crystal and comprises several counters operating according to different timebases. Each counter of this first clock is, for example, coded in binary form (BCD, standing for "Binary-Coded Decimal"). The lowest timebase of the counters is, for example, the second. The other counters have higher timebases such as minute, hour, day, month and year.

The time management system also comprises a second clock H2 incremented by software and implemented in the manufacturer program P of the automatic control equipment. This second clock H2 consists of a periodic interruption according to which the automatic control equipment manages and synchronizes its tasks defined in its application program. The periodic interruption is generated using a quartz crystal. This periodic interruption is, for example, one millisecond. Based on this periodic interruption, the manufacturer program P manages several counters operating according to different timebases. One counter C2, for example encoded on 32 bits, presents a second-based timebase and another counter C3, for example encoded on 16 bits, presents a millisecond-based timebase. These two counters C2, C3 are employed to determine the date and time used in the application program or to date-stamp events with a resolution of one millisecond.

In normal operation, the two clocks H1, H2 are powered by the main electrical power supply G1. On an outage of the main electrical power supply G1, the auxiliary electrical power supply G2 takes over to power only the first clock H1.

The quartz crystals of the first clock H1 and of the second clock H2 are not exactly synchronous, and both drift. Consequently, in normal operation, the two clocks H1, H2 must be periodically synchronized in order to make them consistent with each other. The first clock H1 is thus synchronized periodically with the second clock H2 which therefore constitutes the reference. For this, given that the lowest common timebase between the two clocks H1, H2 is the second, the two values of the second counters C1, C2 of the first clock H1 and of the second clock H2 are compared. To be sure that the two clocks H1, H2 are both in the same minute at the moment of the comparison, the comparison is done when the second counter C1, C2 of the first or second clock is at 30. In practice, the issue is primarily to avoid making the comparison when the counters have values close to 0 or 59. At the time of the comparison, if the second counters C1, C2 are different, the value of the second counter C1 of the first clock H1 is overwritten with the value of the second counter C2 of the second clock H2. The time to write the second clock H2 into the first clock H1 is considered to be negligible.

On an outage of the main electrical power supply, only the first clock H1 is kept powered up thanks to the auxiliary electrical power supply G2. The data of the second clock H2 is therefore lost. After the end of the outage of the main electrical power supply G1, it is therefore necessary to resynchronize the second clock H2 using the first clock H1. This, when the main electrical power supply G1 is restored, involves detecting the next change of the counter having the lowest timebase in the first clock H1 (in this case, it is the second counter C1) then, at the moment of this detection:

the values of all the counters of the first clock H1 are written into the corresponding counters of the second clock H2 and, all the counters of the second clock H2 having a timebase less than the timebase of the first clock are zeroed. The counter C3 of the second clock H2 is therefore zeroed.

In this way, after the main electrical power supply G1 is restored, the two clocks H1, H2 restart in perfect synchronism.

According to the invention, the second clock H2 can also be synchronized using external means by the use of a communication network. This synchronization can be achieved between several logic controllers of one and the same fieldbus or from external information transmitted via a network, for example of Internet type.

It is obviously possibly, without departing from the context of the invention, to devise other variants and refinements of detail, and even consider the use of equivalent means.

The invention claimed is:

1. A time management method for automatic control equipment comprising:

counting, at a first clock having a first counter storing a first value, based on a first time base;

counting, at a second clock having a second counter storing a second value, based on a second time base identical to the first time base;

counting, at a third counter of the second clock, based on a third time base that is quicker than the second time base;

powering, at a main electrical power supply, the first and second clocks;

powering, at an auxiliary electrical power supply, the first clock in response to a main electrical power supply outage;

performing, at a central processing unit, a periodic synchronization between the first counter and the second counter by loading the second value of the second counter into the first counter when the first counter is different from the second counter; and performing, at the central processing unit, in response to the main electrical power supply being restored, a resynchronization of the second clock, based on a modification of the first counter, by loading the first value of the first counter into the second counter and zeroing the third counter wherein
the first clock is based only on the first time base, and
the second clock is based only on the second and third time bases.

2. The time management method according to claim 1, wherein the resynchronization is performed in response to a detection of a next change in the first counter after the main electrical power supply is restored.

3. The time management method according to claim 1, wherein the first clock is a hardware component of a Real Time Clock type.

4. The time management method according to claim 1, wherein the first time base is in seconds.

5. The time management method according to claim 1, wherein the second clock is incremented by software.

6. The time management method according to claim 1, wherein the third time base is in milliseconds.

7. The time management method according to claim 1, wherein the auxiliary electrical power supply is a capacitor.

8. The time management method according to claim 1, wherein the periodic synchronization is performed on a basis of the second counter of the second clock.

9. A time management system for automatic control equipment comprising:
a first clock having a first counter configured to operate on a first time base, the first counter storing a first value;
a second clock having a second counter configured to operate on a second time base identical to the first time base and a third counter configured to operate on a third time base that is quicker than the second time base, the second counter storing a second value;
a main electrical power supply configured to power the first and second clocks;
an auxiliary electrical power supply configured to power the first clock in response to a main electrical power supply outage;
a central processing unit configured to
periodically synchronize the second counter and the first counter by loading the second value of the second counter into the first counter when the first counter is different from the second counter, and
perform a resynchronization of the second clock after an end of a main electrical power supply outage, based on a modification of first counter, by loading the first value of the first counter into the second counter and zeroing the third counter
wherein
the first clock is based only on the first time base, and
the second clock is based only on the second and third time bases.

10. The time management system according to claim 9, wherein the first clock is a hardware component of a Real Time Clock type.

11. The time management system according to claim 9, wherein the first time base is in seconds.

12. The time management system according to claim 9, wherein the second clock is controlled by software.

13. The time management system according to claim 9, wherein the third time base is in milliseconds.

14. The time management system according to claim 9, wherein the auxiliary electrical power supply is a capacitor.

15. A time management system for automatic control equipment comprising:
first counting means for counting, at a first counter storing a first value, based on a first time base;
second counting means for counting, at a second counter storing a second value, based on a second time base identical to the first time base and for counting, at a third counter of the second counting means, based on a third time base that is quicker than the second time base;
power supply means for powering the first and second counting means;
auxiliary power supply means for powering the first counting means in response to a power supply means outage;
processing means for
periodically synchronizing the second counter and the first counter by loading the second value of the second counter into the first counter when the first counter is different from the second counter, and
performing a resynchronization of the second counting means after an end of a power supply means outage, based on a modification of first counter, by loading the first value of the first counter into the second counter and zeroing the third the third counter
wherein
the first counting means is based only on the first time base, and
the second counting means is based only on the second and third time bases.

* * * * *